Patented Jan. 25, 1938

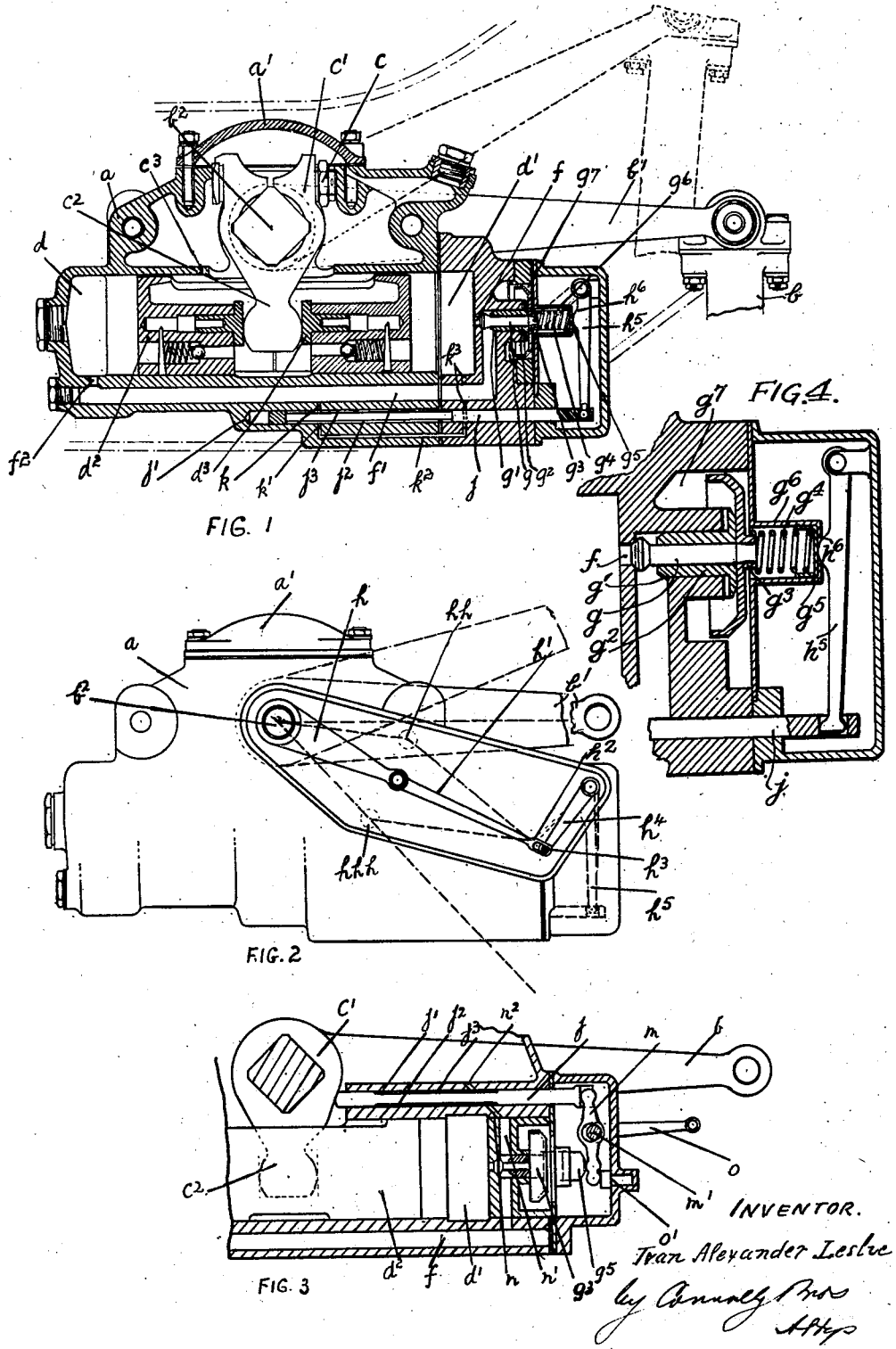

2,106,461

UNITED STATES PATENT OFFICE 2,106,461

HYDRAULIC SHOCK DAMPER

Ivan Alexander Leslie, Derby, England, assignor to Rolls Royce Limited, Derby, England Application April 27, 1935, Serial No. 18,700
In Great Britain April 27, 1934

6 Claims. (Cl. 188—88)

This invention is for improvements in hydraulic shock dampers and has for its object to provide an automatic shock damper control to increase the damping with increases in spring deflections.

It is known to increase the resistance of hydraulic shock dampers either manually or automatically dependent on road wheel speed, by varying the loading of the spring or springs which control the valves which in turn control the escape of liquid from the compression chamber or chambers of the shock damper. Both these arrangements have disadvantages, the former because it imposes an extra control upon the driver, and the latter because the severity of road shocks is only to a certain extent dependent on the speed of the automobile.

The ideal is to make the extent of the damping dependent on the amount of spring deflection and this might be done by making the resistance of the valve dependent on the extent of the displacement of the wheel and consequently of the damper piston and the parts connecting the wheel to the damper piston. The difficulty, however, with such an arrangement is that to be effective it is necessary that the increased damping should be maintained until the wheel and damper piston settle down in the normal position. If, however, it be arranged that one of the aforesaid parts connecting the wheel to the damper piston, on being moved or on being moved a predetermined amount through a suitable leverage, causes movement of a member to bear on the valve spring or otherwise to increase the loading thereof, as soon as the wheel begins to move to the normal position again the extra loading will be removed from the valve and the loading returns to normal.

This invention has for its object to overcome this difficulty.

According to this invention the resistance of the shock damper is increased proportionately to the wheel displacement and there are provided hydraulic locking means which maintain the increased resistance during oscillation of the oscillating member of the shock damper between the extreme positions of the oscillation.

Preferably the hydraulic shock damper is of the type in which there are two compression chambers and liquid is forced from one to the other on displacement of the wheel and from the latter to the former on the return of the wheel and one or more valves control such movement of the said liquid and the valve loading is increased by a member displaced so as to increase this valve loading proportionately to the wheel in displacement which loading member is connected to a locking member sliding in a tube having two spaces between the said member and inner wall of the tube each of which is in communication with one of the compression chambers so that between the change-over position of each oscillation of the oscillating members of the shock damper the locking member is locked against the side of its tube by pressure in one of the said spaces and thus prevents the return of the loading member.

In a hydraulic shock damper of the double ended piston type the displacement of the loading member may be brought about by the rocking member which displaces the piston.

Means may be provided controlled by the driver for varying the amount of increase of damper resistance communicated to the loading member.

The resistance of the damper may be increased on every wheel displacement or only on substantial wheel displacements.

While the locking member will prevent the return of the resistance during the oscillation of the shock damper member (and therefore of the wheel) between the extreme positions of oscillation it will be appreciated that at those extreme positions the return of the loading member will be prevented by the member which initially displaces the same preventing such return beyond a position corresponding to that to which such last mentioned member is displaced. It may, however, also be initially while the change-over between the oscillations is comparatively rapid that the locking member will not be freed a sufficient length of time to allow the loading member to return at will to or return any substantial distance.

Two examples of this invention are illustrated in the accompanying drawing in which Figure 1 is a vertical section of a double ended piston type of shock damper constructed according to this invention.

Figure 2 is a vertical elevation with the cover removed of the same shock damper.

Figure 3 is a vertical elevation of one end of a modified form of shock damper but having a different form of valve loading means.

Fig. 4 is a central sectional view, on an enlarged scale, of the valve mechanism at the end of the shock damper.

$a$ is the shock damper casing with a top cover $a^1$. The shock damper is connected to the wheel axle (not shown) by a rod $b$ and an arm $b^1$, the displaced position of the latter following wheel displacement being shown in dotted lines in Figures 1 and 2.

The arm $b^1$ is rigid with a shaft $b^2$ which rocks in bearings in the casing and is centrally squared as shown in Figure 1. Clamped around the square part by bolt $c$ are the divided ends $c^1$ of a lever $c^2$ which depends into cylinder $c^3$ having two closed ends $d$ and $d^1$ forming compression chambers. In this cylinder reciprocates a double ended piston $d^2$ which carries internally two hardened members $d^3$ between which operates the cylindrical shaped end of lever $c^2$. The movement of the wheel in either direction up or down and the corresponding movement of the arm $b^1$ up or down will move the piston $d^2$ to the right or left. In the former case oil in the compression chamber $d^1$ will flow through hole $f$, transfer passage $f^1$ (drilled through the shock damper casing) and hole $f^2$ into compression chamber $d$. When the piston moves to the left the oil will flow in through the same ports and passages in the reverse direction. In either case such flow is resisted by valve $g$, the end of which sits on the outer end of hole $f$. If the pressure comes from the compression chamber $d^1$ valve $g$ is lifted directly by pressure acting on its end. If the pressure comes from the compression chamber $d$ it presses on a shoulder $g^1$ on a sleeve member $g^2$ sliding on the valve stem, but which is in contact with the diaphragm member $g^3$ rigidly secured on the end of the stem of valve $g$. In either case the valve is lifted against the reaction of a coil spring $g^4$ which reacts between the said diaphragm member and a cap $g^5$ which is adapted to slide internally in a cylinder $g^6$ rigid with the casing. The purpose of diaphragm $g^3$ which moves in an oil filled chamber $g^7$ is to damp out oscillations of the valve.

It will be seen that the resistance of the valve $g$ and therefore the damping of the shock damper (regardless of the direction of the movement of the wheel) can be increased by moving the cap $g^5$ to the left and compressing spring $g^4$. This movement is brought about automatically and is dependent upon the extent of the deflection of the wheel in manner now to be described.

Rigid with the shaft $b^2$ (see Figure 2) is a lever $h$ which is articulated to a rod $h^1$. On the end of rod $h^1$ is a slot $h^2$ in which is a pin $h^3$ on a lever $h^4$ fulcrumed to the casing. Rigid with lever $h^4$ is a lever $h^5$ which has formed on it boss $h^6$ (see Figure 1) which bears against the cap $g^5$.

It will be appreciated from Figure 2 that whichever way the lever $b$ is displaced (whether the end of the lever $h$ is moved to the position shown in dotted lines at $hh$ or at $hhh$) the end of lever $h^4$ will be moved to the left, lever $h^5$ correspondingly moved to the left and the loading of spring $g^4$ accordingly increased. Further the movement of lever $h^4$ and the loading of spring $g^4$ will be dependent on the extent of the displacement of the lever $b^1$, that is the extent of the road shock.

It will also be appreciated that lever $h$ can return to and through the mean position without affecting lever $h^4$ by reason of the lost motion provided between slot $h^2$ and pin $h^3$. As soon, however, as lever $h^4$ is released by rod $h^1$ it would return to its normal position under the influence of spring $g^4$. Such return is however prevented by the hydraulic locking member now to be described.

To the end of lever $h^5$ is articulated a rod $j$ sliding in a bore $j^1$ in the casing. This rod is a comparatively flexible member and, except where cut away, a comparatively close fit in the bore. Flats $j^2$ and $j^3$ are formed on the upper and lower sides of the rod, leaving space between the flats and the wall of the bore. The upper space, that is above the bore $j^3$ is in communication through drilled hole $k$ with the transfer passage $f^1$ or with compression chamber $d$. The lower space, that is below the flat $j^2$ is in communication through holes $k^1$, $k^2$ and $k^3$ (shown in dotted lines) with the compression chamber $d^1$. Pressure against either of the flats will cause the rod to be frictionally held at its ends, by fluid pressure against the wall of the bore $j^1$ and prevent the return of lever $h^5$ under the influence of spring $g^4$. On the initial movement of the piston, pressure will build upon one of the flats and tend to resist displacement of rod $j$ by lever $h$. The frictional resistance, however, of the rod $j$ against the wall of the bore $j^1$ will be overcome by the positive pull of the lever $h$, behind which will be the full force of the road shock on the wheel.

It will be appreciated, therefore, that while the shock damper piston is oscillating between the extreme positions of each oscillation one or other of the flats $j^2$ or $j^3$ will be under pressure and the rod $j$ locked in its bore. At the changeover from one oscillation to the other the rod will be free to return under the influence of spring $g^4$ whenever it is not subjected to a radial thrust on one of the flats or positively held displaced by displacement of lever $h$, but at this moment lever $h$ will also be at the end of its oscillation and this return will be limited by pin $h^3$ coming into contact with the end of slot $h^2$. The effect will be that as the oscillations die down rod $j$ will gradually return under the influence of spring $g^4$ to return the damping to normal. Normally on the first reversal of oscillation movement there will hardly be time for the rod to move appreciably back before it is again held by oil pressure on the other side, but as the piston oscillates more to its normal position, the rod will gradually move back as before described.

In Figure 3 is shown an alternative form of spring loading member. In this figure like parts to those illustrated in Figures 1 and 2 have the like lettering.

The divided end $c^1$ of lever $c^2$ forms a cam surface which bears on the end of the rod $j$ moving in a bore $j^1$ in the casing and having flats $j^2$ and $j^3$ as before described. Whichever way the piston $d^2$ oscillates from normal position rod $j$ is displaced to the right. Rod $j$ is articulated to a two arm lever $m$ fulcrumed at $m^1$ in manner hereinafter to be described. The other end of lever $m$ bears on cap $g^5$ and loads the spring $g^4$ (not shown) reacting between this cap and diaphragm $g^3$.

In the example illustrated in Fig. 3 the extent to which the valve loading is increased is partially under the control of the driver, the fulcrum $m^1$ of lever $m$ being formed as an eccentric which can be rotated by a lever $o$ which is controlled by the driver by means (not shown). By means of this lever the fulcrum can be moved to the left or right so as to increase or diminish the damping. At $o^1$ is shown a stop which limits outward movement of the lower end of lever $m$.

In the device shown in Fig. 3 the increased loading is only put on and held when the arm $b^1$ is moving upward. The oil, therefore only in the space caused by the flat $j^2$ has to be put under compression, while the oil in the other space must be allowed to flow out of the latter to permit the rod to bend under compression. Provision for this action is made by the formation of the passage $n^2$, leading from the bore of the rod to the reservoir for oil located in the upper part of the casing $a$ in which there is no compression. The passage $n^2$ is not in communication with either of the compression chambers and the flattened portion of the rod is allowed to yield in one direction against the pressure of oil in the other direction.

It will be appreciated that the invention is not limited in any way to the double ended piston type of hydraulic shock damper, but may be applied to any shock damper in which the liquid is forced from one compression chamber to another on a displacement of the wheel and in one direction and in the contrary direction on return of the wheel.

What I claim is:

1. A hydraulic shock damper for the road wheels and axles of road vehicles, adapted to be mounted on the vehicle and having a compression chamber with inlet and outlet passages for the admission and escape of a damping fluid, a compression member operable in said chamber from a road wheel axle and arranged and adapted to place said fluid under compression during the return movement of the wheel after displacement thereof, valve means arranged and adapted to control the escape of the fluid from the compression chamber, valve loading means operable from the wheel axle and arranged and adapted to increase the valve loading proportionally to the amount of wheel displacement and hydraulically controlled locking means connected to the valve controlling means for maintaining the increased valve loading during the return of the wheel after displacement thereof, said locking means comprising two telescopically arranged members one slidably fitting within the other, said members being, relatively, axially displaceable under displacement of the wheel, there being provided a space between the two members, in communication with the compression chamber whereby the fluid therein will exert a radial pressure on said members and frictionally lock them together thus preventing their axial return movement and maintaining the increased valve loading during the return of the wheel to normal after its displacement.

2. A hydraulic shock damper as claimed in claim 1 but in which the valve mechanism which controls movement of the liquid flowing in either direction between the compression chambers includes but a single valve.

3. A hydraulic shock damper, as claimed in claim 1, of the double ended piston type in which the displacement of the loading means is effected by a rocking member which causes displacement of the shock damper piston, the loading member being displaced in the same direction whichever way the rocking member is displaced.

4. A hydraulic shock damper, as claimed in claim 1, in which the loading means consists of a lever adapted to bear on a seating of the spring which loads the valve and to move such seating proportionately to the displacement of the lever.

5. A hydraulic shock damper, as claimed in claim 1, in which means are provided under the control of the driver for controlling the amount of increased damper resistance.

6. A hydraulic shock damper for the road wheels of motor vehicles comprising a casing adapted to be mounted on a vehicle and having a compression chamber for the reception of a damping fluid and a compression member operable therein from the axle of the vehicle, valve controlled means for the passage of the damping fluid into and from the compression chamber, valve loading means operable from the axle of the vehicle and arranged and adapted to increase the valve loading proportionately to the amount of wheel displacement and hydraulic locking means for maintaining the increased valve loading during the return movement of the wheel after displacement, which locking means comprise two members forming a sliding fit, one inside the other one being axially movable with reference to the other and mechanically connected to the valve loading means with a space between the said members in communication with the compression chamber of the shock damper whereby the fluid therein places a radial thrust on the said members and prevents their relative axial movement during the return movement of the wheel after its displacement.

IVAN ALEXANDER LESLIE.